Dec. 1, 1936.  F. M. ARCHIBALD  2,062,347
PROCESS OF PURIFYING ACID SLUDGE
Filed Dec. 29, 1934
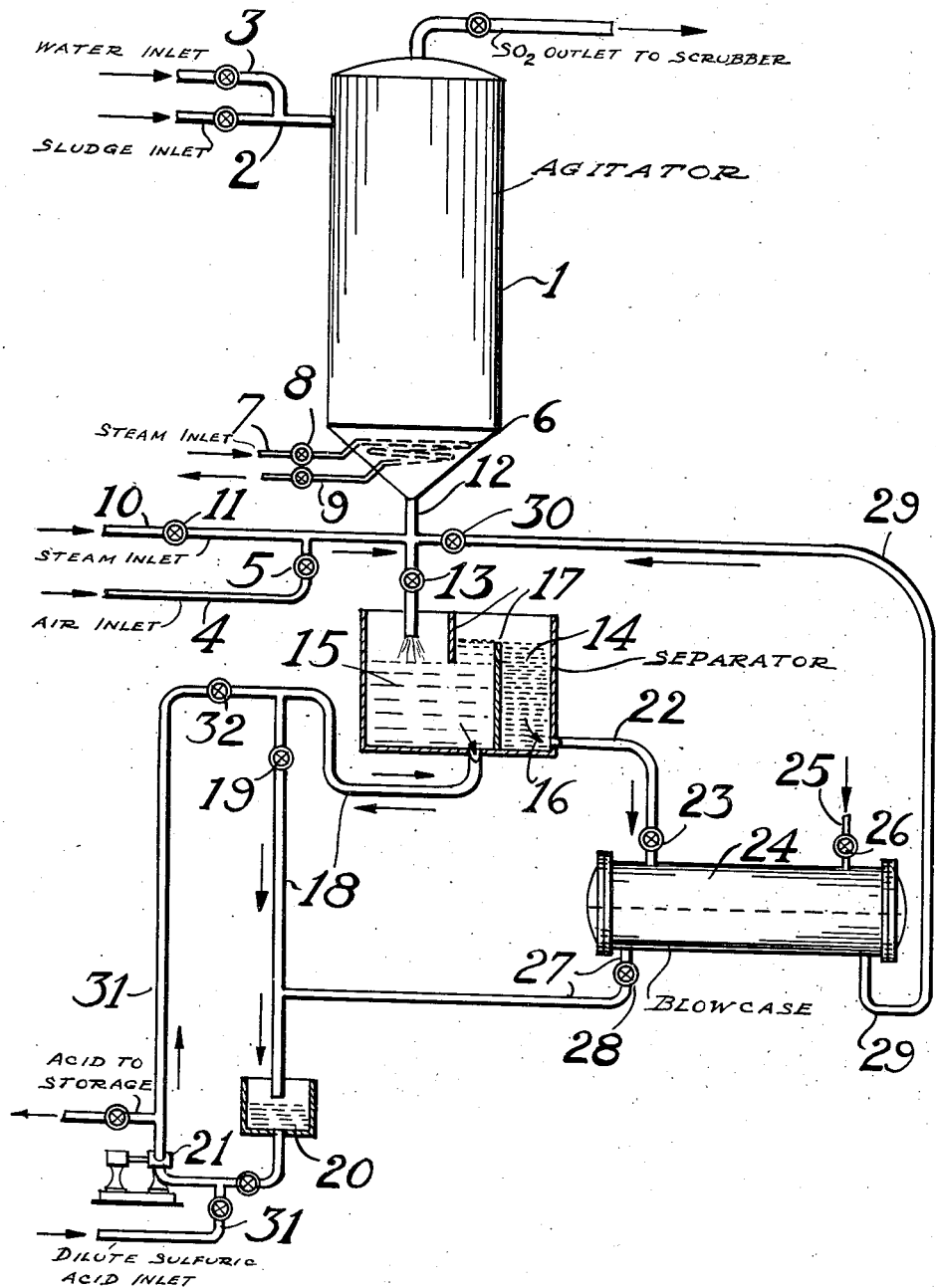
Francis M. Archibald Inventor
By P. L. Young, Attorney Patented Dec. 1, 1936

2,062,347

UNITED STATES PATENT OFFICE 2,062,347

PROCESS OF PURIFYING ACID SLUDGE

Francis M. Archibald, Elizabeth, N. J., assignor to Standard Oil Development Company, a corporation of Delaware Application December 29, 1934, Serial No. 759,621

7 Claims. (Cl. 23—173)

This invention relates to a process of purifying acid sludge and refers particularly to separately recovering from an acid sludge formed during the sulfuric acid treatment of petroleum hydrocarbons, a dilute sulfuric acid, petroleum hydrocarbons, and a washed sludge, and apparatus therefor.

In refining petroleum hydrocarbons it is necessary to remove impurities such as sulfur compounds, asphaltic material, etc., and at the same time obtain a maximum amount of useful products. The treatment is generally made with sulfuric acid. The strength and amount of sulfuric acid used is determined by the oil being treated and the desired finished refined oil wanted. The sulfuric acid, after contacting with the petroleum hydrocarbons, is separated in the form of an emulsion known as "acid sludge", consisting of sulfuric acid, impurities that were present in the petroleum hydrocarbons and a fraction of the petroleum hydrocarbons.

An object of this invention is to so treat the acid sludge to obtain a maximum amount of sulfuric acid with the least dilution with water and contamination with the impurities as one fraction together with other separate fractions of washed sludge consisting of the impurities with a small percentage of sulfuric acid and a small fraction of petroleum hydrocarbons.

This and other objects of the invention will be clearly understood by reading the following description of the process with reference to the accompanying drawing, which is of a diagrammatic nature.

Referring to the drawing, acid sludge is introduced into agitator 1 together with enough water to dilute the free acid in the sludge to about 50% strength by means of pipes 2 and 3. The sludge and water are charged slowly into the agitator while agitating the mixture with air introduced through pipe 4 provided with valve 5. A steam coil 6 provided with inlet 7 arranged with valve 8 and outlet 9 is used to heat the mixture. Steam introduced through pipe 10 arranged with valve 11 may also be used to agitate the mixture. The temperature of the mixture is not allowed to rise higher than 100° C., preferably being maintained lower by regulating the quantity of steam passing through coil 6 and into the agitator 1 through pipe 10, and the quantity of air passing into the agitator 1 through pipe 4.

When the agitator 1 is charged, the agitating or blowing with air is continued until no more sulfur dioxide is evolved. Steam may also be used if the temperature falls below 90° C. When the mixture is sweetened, i. e. no more sulfur dioxide is evolved, no more air is used to agitate the mixture. Steam alone is blown through for about 20 to 30 minutes to expel the entrained air. The mixture is then allowed to settle for about 18 hours while a small amount of steam is passed through the closed coil 6 to promote demulsification by gentle convection currents.

On settling, three layers are formed. The lower layer consists of weak sulfuric acid which is immediately drawn off through pipe 12 arranged with valve 13, separator 14, pipe 18 arranged with valve 19, and sight box 20 by means of pump 21 to storage (not shown). The middle layer (an emulsion) is also drawn off into separator 14 through pipe 12 but in this case valve 13 is half cocked to produce a "wire drawing" effect to break the emulsion. A strainer or orifice plate placed below valve 13 may also be used to break the emulsion. There the acid part of the emulsion that has separated is removed by means of pipe 18. The flow of the emulsion in separator 14 is regulated by means of baffles 17; first the emulsion passes into compartment 15 of the separator and then overflows into compartment 16 to be withdrawn to blow case 24 by means of pipe 22 arranged with valve 23. When it is desired to remove all of the emulsion from the separator, compartment 15 is filled with an immiscible liquid, such as dilute sulfuric acid, through pipe 31 arranged with valve 32, which causes the emulsion to overflow into compartment 16 from which it is withdrawn to blow case 24.

The emulsion, on being subjected to the mechanical disturbance and a temperature change brought on by passing into blow case 24, separates into two layers on standing for about 2 to 3 hours. An air vent 25 arranged with valve 26 is provided so that the pressure may be exerted on the two layers in the blow case to aid the removal. First the lower layer of dilute acid is removed through pipe 27 arranged with valve 28 to storage by means of pipe 18. Then the remaining layer of the emulsion and separated oil is passed through pipe 29 arranged with valve 30 to agitator 1. This cycle is repeated two or three times in order to complete the elimination of the weak acid from the sludge. The final product obtained from the blow case contains from 5 to 10% of free sulfuric acid. This product is finally mixed with the upper oil layer formed in agitator 1 and is used as fuel, extracted for sulfonates, or in the manufacture of asphaltic material, etc. The acid content of the resulting mixture is about 2 to 5%.

The foregoing description is merely illustrative and various changes and alternative arrangements may be made within the scope of the appended claims in which it is my intention to claim all inherent novelty in the invention as broadly as the prior art permits.

I claim:

1. A process of purifying sludge formed by the treatment of petroleum hydrocarbons with sulfuric acid, comprising diluting acid sludge formed by the sulfuric acid treatment of petroleum hydrocarbons, heating the diluted acid sludge, settling the diluted acid sludge, separating a weak acid fraction that has separated on settling, subjecting the emulsion layer to rapid flow through a constricted opening to separate dilute sulfuric acid, cooling the emulsion, separating the dilute acid that settles out and returning the emulsion to a separated oil layer formed by said dilution, heating, agitating and settling.

2. A process of purifying sludge formed by the treatment of petroleum hydrocarbons with sulfuric acid, comprising diluting an acid sludge formed by the sulfuric acid treatment of petroleum hydrocarbons, heating the diluted acid sludge to a temperature not over 100° C., agitating the diluted acid sludge, settling the diluted acid sludge, separating a weak acid layer, separating an emulsion layer, allowing the emulsion to cool, separating the dilute acid that settles out and returning the emulsion to a separated oil layer formed by said dilution, heating, agitating, and settling.

3. A process of purifying acid sludge according to claim 2, in which the oil layer together with the returned emulsion is recycled a plurality of times through the various steps.

4. A process of purifying sludge formed by the treatment of petroleum hydrocarbons with sulfuric acid, comprising diluting by 50% the acid strength of an acid sludge formed by the sulfuric acid treatment of petroleum hydrocarbons, heating the diluted acid sludge to a temperature not over 100° C., agitating the diluted acid sludge, settling the diluted acid sludge, separating a weak acid layer, separating an emulsion layer, allowing the emulsion to cool, separating the dilute acid that settles out and returning the emulsion to a separated oil layer formed by said dilution, heating, agitating, and settling.

5. A process of purifying sludge formed by the treatment of petroleum hydrocarbons with sulfuric acid, comprising diluting an acid sludge formed by the sulfuric acid treatment of petroleum hydrocarbons, heating the diluted acid sludge to a temperature of 90° to 100° C., agitating the diluted acid sludge, settling the diluted acid sludge, separating a weak acid layer, separating an emulsion layer, allowing the emulsion to cool, separating the dilute acid that settles out and returning the emulsion to a separated oil layer formed by said dilution, heating, agitating, and settling.

6. A process of purifying sludge formed by the treatment of petroleum hydrocarbons with sulfuric acid, comprising diluting an acid sludge formed by the sulfuric acid treatment of petroleum hydrocarbons, heating the diluted acid sludge to a temperature not over 100° C., agitating the diluted acid sludge, settling the diluted acid sludge about 18 hours, separating a weak acid layer, separating an emulsion layer, allowing the emulsion to cool, separating the dilute acid that settles out and returning the emulsion to a separated oil layer formed by said dilution, heating, agitating, and settling.

7. In combination, an agitator, means for introducing an acid sludge formed by the sulfuric acid treatment of petroleum hydrocarbons and water into said agitator, a heating coil in said agitator, means for passing steam and air into the lower part of said agitator, means for passing separately the layers formed in said agitator to a separator, means for separating heavy and lighter immiscible liquids in said separator, a blow case, means for passing a liquid from said separator to said blow case, means for separately withdrawing liquid layers of immiscible liquids from said blow case and means for passing liquids from said blow case to said agitator.

FRANCIS M. ARCHIBALD.